United States Patent
Reip

[11] 3,790,127
[45] Feb. 5, 1974

[54] HYDRAULIC VALVE
[75] Inventor: Raymond G. Reip, Clarendon Hills, Ill.
[73] Assignee: Vapor Corporation, Chicago, Ill.
[22] Filed: Nov. 3, 1972
[21] Appl. No.: 303,354

[52] U.S. Cl. ............ 251/129, 137/596.16, 251/139, 251/141, 251/281
[51] Int. Cl. ......................................... F16k 31/02
[58] Field of Search ... 251/129, 139, 141, 281, 298, 251/303; 137/625.44

[56] References Cited
UNITED STATES PATENTS

| | | | |
|---|---|---|---|
| 2,863,473 | 12/1958 | Gantz | 251/139 X |
| 2,850,685 | 9/1958 | Ray | 251/141 X |
| 2,635,138 | 4/1953 | Reisner | 251/141 X |
| 2,964,286 | 12/1960 | Hoskins | 251/139 X |
| 3,215,162 | 11/1965 | Carver | 251/141 X |
| 3,246,662 | 4/1966 | Shebanow | 251/141 X |
| 2,926,691 | 3/1960 | Huff | 251/129 X |
| 3,532,121 | 10/1970 | Sturman et al. | 251/129 X |
| 3,570,807 | 3/1971 | Sturman et al. | 251/129 X |

*Primary Examiner*—Alan Cohan
*Assistant Examiner*—Gerald A. Michalsky
*Attorney, Agent, or Firm*—Lloyd L. Zickert

[57] ABSTRACT

An intrinsically safe hydraulic valve including a first stage in the form of pilot valves and a second stage in the form of a poppet valve assembly. The poppet valve assembly includes first and second pairs of piston operated poppets which, when selectively operated, control the drive direction of a fluid motor. The pilot valves are electrically controlled through an electromagnet arrangement wherein the valves are closed when the electromagnet is de-energized and opened when it is energized. When the pilot valves are selectively opened, they apply a pilot pressure to one or the other of the pairs of piston operated poppets to drive the fluid motor.

13 Claims, 9 Drawing Figures

PATENTED FEB 5 1974

SUPPLY (INLET) PRESSURE

TO (OUTLET) POPPETS AND DRAIN THRU RESTRICTION

SUPPLY (INLET) PRESSURE

TO (OUTLET) POPPETS AND THRU RESTRICTION

HYDRAULIC VALVE

This invention relates in general to the control of hydraulic fluid flow in a hydraulic circuit for operating a fluid motor, and more particularly to an intrinsically safe electrically operated valve for hydraulically operating a fluid motor which will lock the fluid motor in its last position in the event of either or both electrical or hydraulic failure, and still more particularly to an intrinsically safe electrically operated valve for hydraulically controlling a fluid motor which includes a first stage having unique pilot valves and a second stage having a unique poppet valve assembly.

The present invention is especially useful for controlling the operation of a double-acting hydraulic cylinder driving a cargo control valve on an oil tanker, although it should be appreciated that it could be employed to control the operation of any fluid motor of the reciprocating or rotary type. For oil tanker application where the valve would be of the electrically operated type as in the present invention, the valve must be either explosion-proof or intrinsically safe. The valve of the present invention operates with a low power requirement and can be intrinsically safe, and when used in connection with a hydraulic cylinder, is capable of locking the cylinder in the last position in the event of either or both electrical or hydraulic failure.

Heretofore it has been known to generally provide sliding spool type valves for controlling hydraulic circuitry. A four-way valve is necessary for operating a double-acting fluid motor. Such a valve is objectionable because it is necessary to involve closely fitted sliding parts which are subjected to wear and malfunction when encountering fine dirt in the oil.

The electrically operated intrinsically safe valve of the present invention includes a first stage in the form of unique pilot valves or hydraulic switches and a second stage in the form of a unique poppet valve assembly, and will provide the functions of a conventional four-way valve in the operation of a double-acting fluid motor. It should be appreciated that the pilot valves could be used apart from the poppet valve assembly in a hydraulic circuit to control a fluid motor such as illustrated by the control valves in U.S. Pat. No. 3,696,837, dated Oct. 10, 1972. The electromagnetic valve of the aforesaid patent is normally open, that is, it is open when de-energized, while the pilot valve in the present application is normally closed, that is, closed when it is de-energized. Accordingly, the pilot valve of the present invention will close in the event of electrical failure.

The pilot valve according to the present invention, like that in the aforesaid patent, is capable of handling relatively high hydraulic pressures on the order of 2,000 psi. The valve includes a tubular magnetic casing closed at the opposite ends by magnetic plates. It is to be understood the term "magnetic" means magnetically permeable material and the term "non-magnetic" means material not magnetically permeable. A coil is arranged within the casing between the end plates and in coaxial relation with the casing. Spaced apart pole pieces are mounted within the coil one against each of the end plates. A generally cylindrical armature operates in an area within the coil and extends coaxial of the coil spanning the space between the pole pieces and seating against the pole pieces to complete the magnetic circuit therebetween when the coil is energized. Like in the aforesaid patent, the pole pieces partially surround the armature to generate a high magnetic closing force over a relatively long stroke. A non-magnetic section is arranged between the pole pieces and includes port means for communicating the supply of pressure from the inlet of the valve to the area about the armature. One end of the armature includes a ball section mating with a socket formed at one of the pole pieces to pivotally mount the armature at that one end. An extension is provided beyond the ball section in the form of a closure member which coacts with a port that is connected to the outlet of the valve. The closure member is in communication with the supply coming from the inlet of the valve. The relationship between the closure member and the port means is such that when the coil is energized, the armature seating against the pole pieces spaces the closure member from the port to allow intercommunication between the inlet and the outlet of the valve, thereby rendering it open. The relationship between the closure member and the port is also such that when the coil is de-energized, the pressure drop due to the fluid flow between the closure member and the port causes the closure member to seat against and close the port, thereby effectively closing the valve and the intercommunication between the inlet and outlet. Inasmuch as the supply pressure is in communication with both sides of the ball and socket mount, a pressure balancing is created across the ball. The length of the closure member which extends on one side of the pivot point of the armature is substantially less than the armature portion on the other side of the pivot, thereby defining a high mechanical leverage. This factor combined with the efficient magnetic structure of the valve where the armature moves laterally within the coil and in relation to a half round pole piece, enables the valve to operate at low intrinsically safe power levels.

The poppet valve assembly includes a first set of piston operated poppets controlled by one pilot valve and a second set of piston operated poppets controlled by another pilot valve. When a pilot valve is energized to thereby open same, it directs the supply pressure to the upper sides of the respective poppets, thereby operating the same against a spring pressure for causing movement of the fluid motor in one direction. Each pair of poppets operates to simultaneously connect one side of the fluid motor to drain and the other side to supply. The piston operated poppets are uniquely constructed and subjected to such pressures that they are closed when not subjected to a pilot supply pressure at their upper sides. Moreover, the undersides of all of the pistons are continuously connected to drain. In the event of hydraulic failure, the poppets will close, thereby locking the fluid motor in the last position. Similarly, in the event of pilot valve failure, the piston operated poppets will close.

It is therefore an object of the present invention to provide an intrinsically safe electrically operated valve for controlling fluid flow in a hydraulic circuit.

It is a further object of the present invention to provide an electrically operated hydraulic circuit control valve requiring only low levels of power for operation and where used to control the operation of a fluid motor will, upon electrical or hydraulic failure, lock the fluid motor in the last position.

Another object of this invention is in the provision of a normally closed electrically operated valve which closes in response to the supply pressure, and which will not stick when encountering fine dirt in the oil, thereby providing a more reliable valve, and which further eliminates sliding parts for low friction operation and includes a mechanical leverage factor for overcoming high pressures.

A further object of this invention is in the provision of an electrically operated intrinsically safe valve for controlling the operation of fluid motors and which can be arranged together in ganged relation where more than one fluid motor is to be operated.

A still further object of the present invention is in the provision of an electrically operated intrinsically safe valve for hydraulically operating a cargo control valve on an oil tanker through a hydraulic cylinder which will lock the cylinder in the last position on either or both electrical or hydraulic failure and which includes relief valves for relieving excessive pressures generated by temperature rise when the cylinder is in locked position.

Other objects, features and advantages of the invention will be apparent from the following detailed disclosure, taken in conjunction with the accompanying sheets of drawings, wherein like reference numerals refer to like parts, in which.

Figure 1:
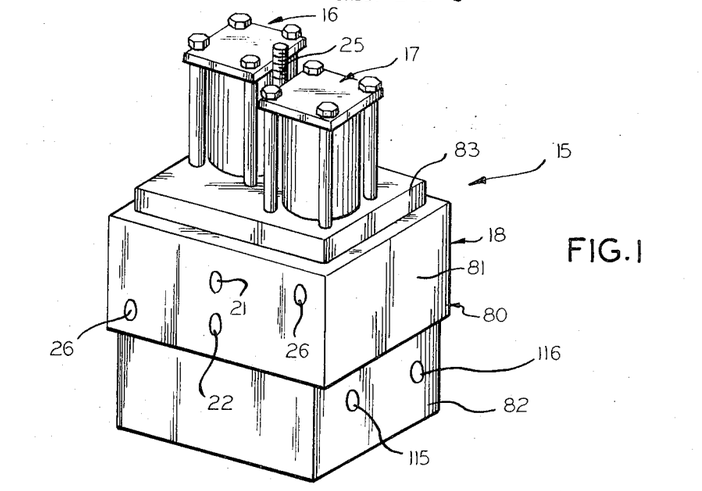
FIG. 1 is a perspective view of the electrically operated intrinsically safe valve according to the present invention which includes stage 1 and stage 2.
Figure 9:
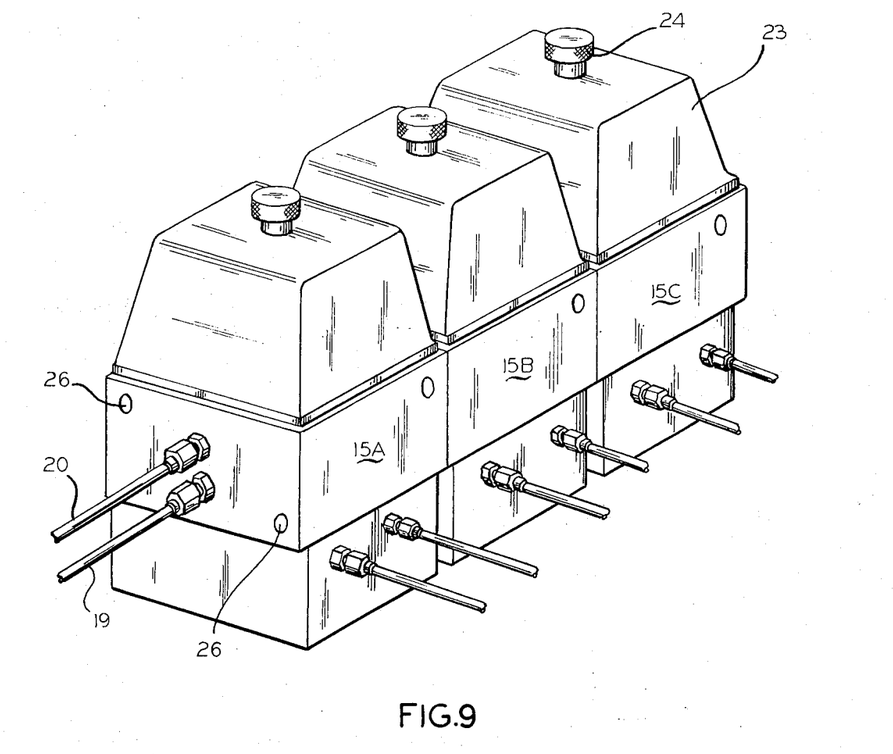
FIG. 9 is a perspective view of a plurality of electrically operated valves according to the invention arranged together in ganged relation.

Referring now to the drawings and particularly to FIG. 1, the electrically operated intrinsically safe valve of the invention, as illustrated and generally designated by the numeral 15, includes pilot valves or hydraulic switches 16 and 17 constituting the first stage and a poppet valve assembly 18 constituting the second stage. The valve in FIG. 1 is shown with the cover removed which would cover the pilot valves. A plurality of valves like that in FIG. 1 are shown arranged together in ganged relation in FIG. 9 which would be employed for operating a plurality of fluid motors and where a common pressure or supply line 19 and a common drain line 20 is provided by virtue of the housings of the valves being in tightly abutting relation so that the drain and the pressure passages are interconnected with one another. As seen in FIG. 1, the drain opening 21 and the pressure or supply opening 22 may be fitted with O-rings to effect a seal between adjacent valves. Weatherproof covers 23 are shown in FIG. 9 in mounted relation over the pilot valves 16 and 17 and held in place by cover nut 24 which engages an anchoring bolt 25 (FIG. 1). As seen in FIG. 9, holes 26 are provided in the bodies of the valves in alignment for receiving rods for interconnecting a plurality of valves in ganged relation.

Figure 2:
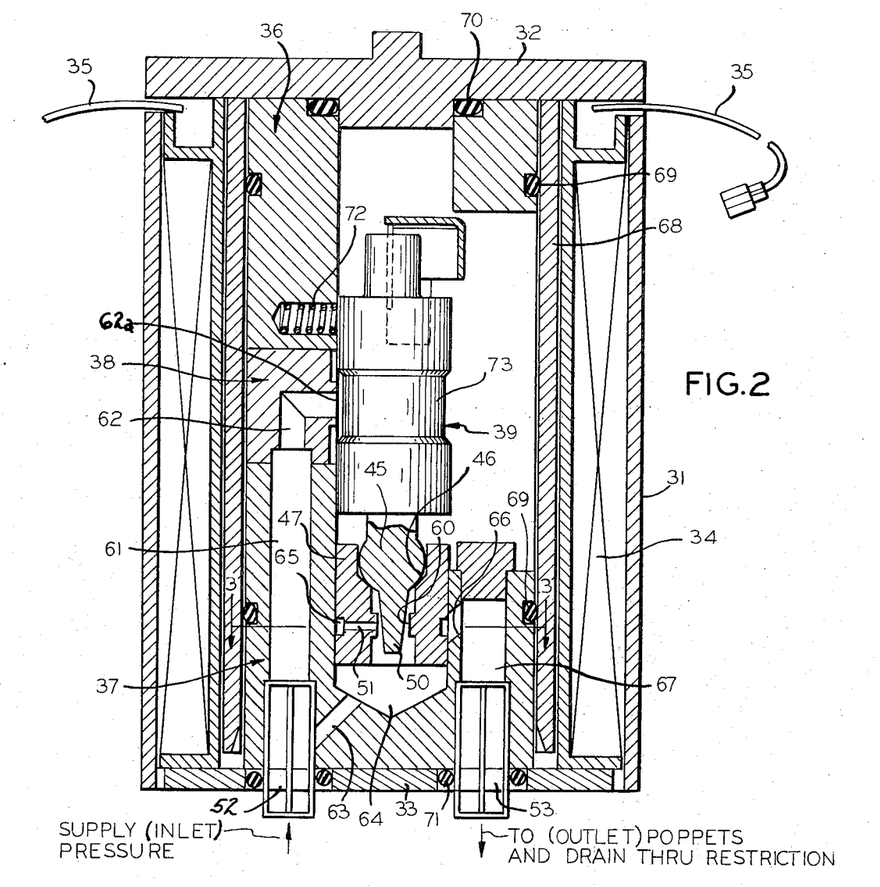
FIG. 2 is a vertical sectional view taken through the pilot valve of stage 1 and illustrating the valve in open position.
Figure 3:
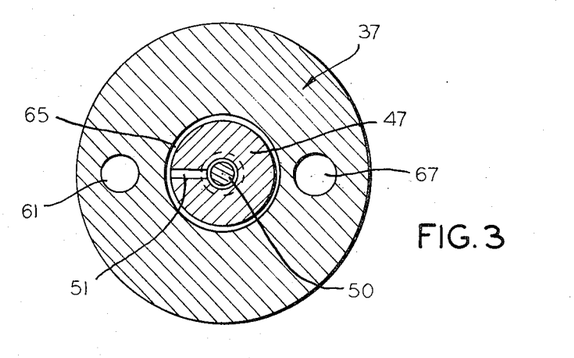
FIG. 3 is a detailed sectional view taken generally along line 3—3 of FIG. 2.
Figure 4:
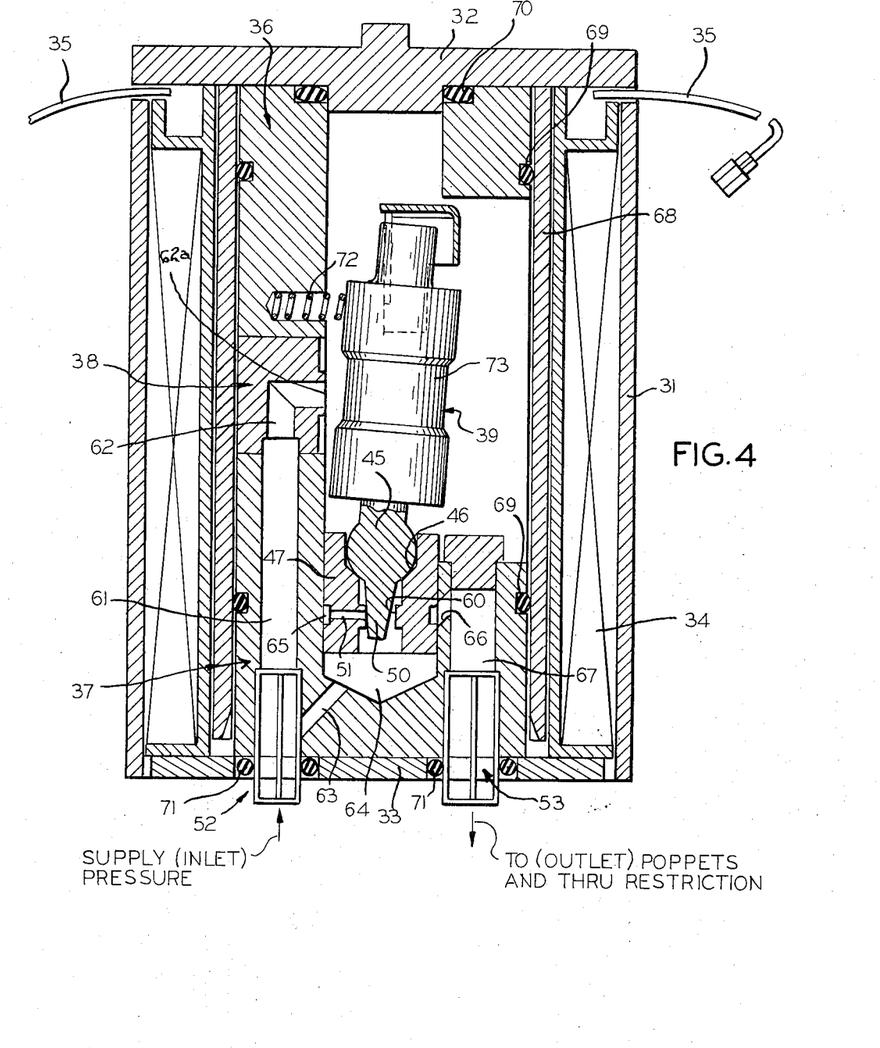
FIG. 4 is a view like FIG. 2 but showing the valve in closed position.

Details of the pilot valves or hydraulic switches are shown in FIGS. 2, 3 and 4 wherein each pilot valve includes a tubular magnetic casing 31 which is preferably cylindrical as shown and closed at opposite ends by magnetic end plates 32 and 33. A coil 34 is arranged within the casing and between the end plates. Leads 35 extend from the valve and are connected to the coil and adapted to be connected to a suitable source of electrical potential. The pilot valve requires very low levels of electrical power on the order of 2-½ watts operating from a 24 volt potential.

Magnetic pole pieces 36 and 37 are arranged within the coil and respectively adjacent the opposite end plates 32 and 33. The pole pieces are spaced apart by means of a non-magnetic section 38. A generally cylindrical armature 39 coacts with the pole pieces and, when in seated position against the pole pieces, completes the magnetic circuit across the non-magnetic circuit 38. The pole pieces include arcuate portions to partially surround the armature 39 as in the valve in the aforesaid patent in order to generate a high magnetic closing force over a relatively long stroke. The armature 39 includes a ball section 45 at one end which is received in a socket 46 formed in a cylindrical insert 47 of the pole piece 37. The insert 47 would be tightly associated with the pole piece and effectively integral but of non-magnetic material. A closure member 50 in the form of an extension from the ball section 45 of the armature coacts with a port 51 for selectively opening and closing the valve and thereby selectively providing communication between the inlet 52 and the outlet 53. The inlet and outlet are provided in the end plate 33 but may be provided in any suitable place. It will be readily seen that the ball 45 and complementary socket 46 forms a pivot for the armature arrangement 39. The extension or closure member 50 is substantially shorter in length than the armature, thereby permitting the armature 39 to communicate a high mechanical leverage on the closure member during energization of the coil and the seating of the armature on the pole pieces. The closure member extends within the insert 47 and also within an annular land or shoulder 60 which functions as a seat for the closure member at the inlet end of the port 51 when the armature is tilted as illustrated in FIG. 4.

The inlet 52 communicates with an elongated passage 61 extending through the pole piece 37 which in turn communicates with a passageway 62 formed in the non-magnetic section 38 that terminates in a port 62a to allow the supply or pressure at the upper side of the ball and socket arrangement. An angle passageway 63 extends from the passageway 61 up to a chamber 64 defined within the pole piece 37 and which communicates with the closure member 50 and the inlet side of the port 51 when the port is open. The port 51 communicates with the outlet 53 through an annular groove 65, a passageway 66 and a passageway 67. Accordingly, both sides of the ball section 45 communicate with the supply or pressure whereby a pressure balance is obtained across the ball section. In order to prevent leakage of the oil from the chamber about the armature, a tubular sleeve 68 arranged coaxially within the coil 34 and coaxially outside of the pole pieces 36 and 37 is provided and associated with O-rings 69. Additionally, O-rings 70 and 71 prevent leakage of oil along the end plates.

The closure member 50 is slightly tapered so that it will squarely seat on the port 51 when in engagement therewith to properly close off the port when the coil is de-energized. It can now be appreciated that energization of the coil brings the armature to the position shown in FIG. 2 which allows flow of oil through the port 51 and intercommunicates the inlet and outlet of the hydraulic valve. Inasmuch as the armature 39 is cylindrical and the ball joint 45 is spherical, the armature can rotate during operation to eliminate any undue wear at any one spot caused by seating of the armature and the closure member.

In the event some residual magnetism or friction at the ball section otherwise prevents or inhibits movement of the armature, a small spring 72 is provided which continually urges a force between the pole piece 36 and the free end of the armature 39. The armature is also annularly grooved or slotted at 73 to assure the communication of the supply pressure to the end of the ball section adjacent the armature. In operation, the pilot valve will open when energized wherein the armature 39 is seated on the pole pieces as shown in FIG. 2. Upon de-energization of the coil, the pressure drop across the closure member due to the flow between the closure member and the port 51 and the difference in pressure between supply and drain forces and holds this end of the armature and the closure member onto and against and in sealing contact with the port 51, thereby closing the valve. Accordingly, the valve is normally closed.

Figure 5:
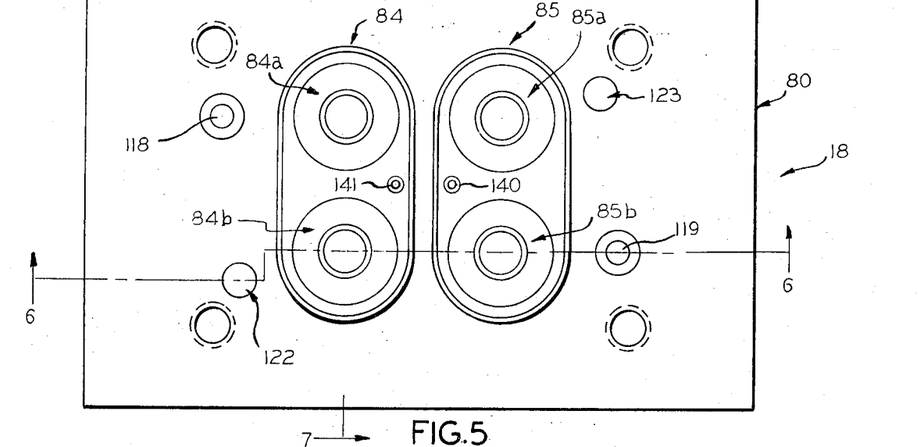
FIG. 5 is a top plan view of the poppet valve assembly of stage 2 with the top plate removed.
Figure 6:
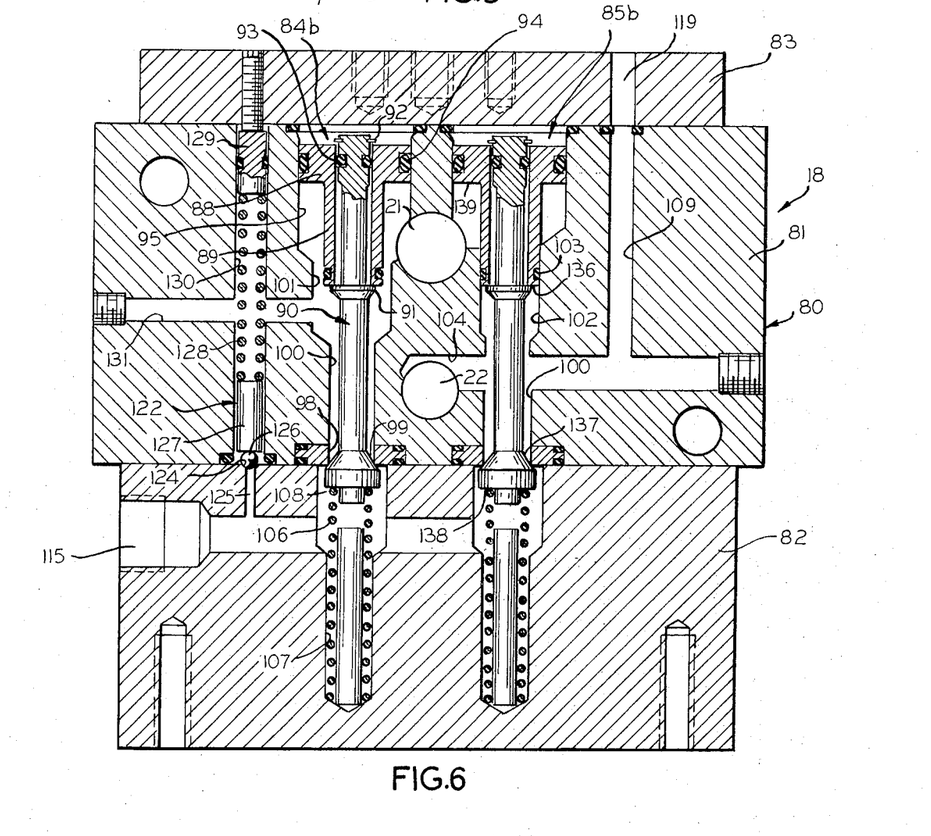
FIG. 6 is a vertical sectional view taken through the poppet valve assembly and generally along line 6—6 of FIG. 5.
Figure 7:
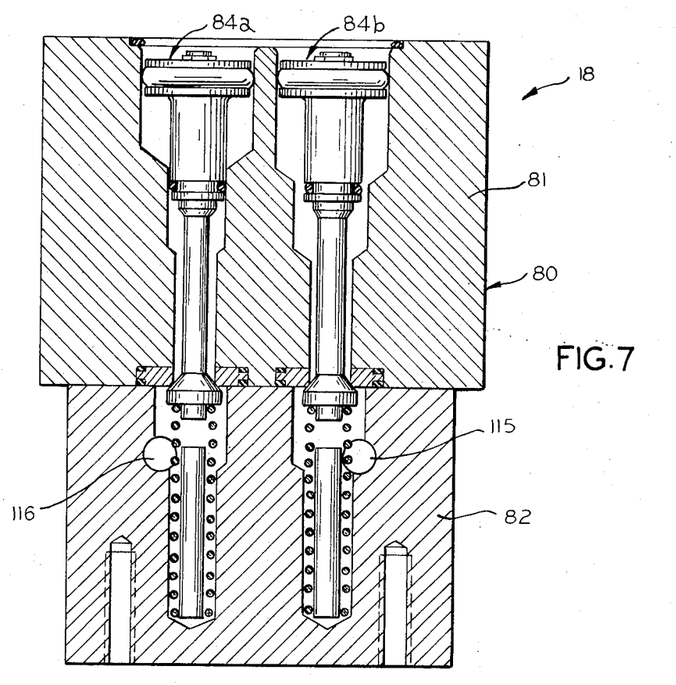
FIG. 7 is a vertical sectional view taken through the poppet valve assembly and generally along line 7—7 of FIG. 5.

The poppet valve assembly 18, operated by the pilot valves 16 and 17 and making up the second stage of the intrinsically safe electrically operated valve of the invention, includes a body 80 (FIGS. 5, 6 and 7) which includes for manufacturing simplicity an upper section 81 and a lower section 82. A top plate 83 is also shown in FIG. 6 to cover the upper section 81 and onto which is mounted the pilot valves 16 and 17. Suitable means not illustrated would be provided for securing the sections together and the top plate onto the upper section.

Two sets of piston operated poppets are provided in the body, one set for operating the fluid motor in one direction and one set for operating the fluid motor in the other direction. Accordingly, one set responds to the pilot pressure of one pilot valve, while the other set responds to the pilot pressure of the other pilot valve. As seen in FIG. 5, the pair of piston operated poppets 84, which includes poppets 84a and 84b, would respond to the actuation of the pilot valve 16, while the second pair of piston operated poppets 85, which includes poppets 85a and 85b, would respond to the actuation of the pilot valve 17. More specifically, the poppets 84a and 85b would be termed pressure or supply poppets for respectively connecting the pressure or supply of the hydraulic circuit to the operating fluid motor, while the poppets 84b and 85a would be considered drain poppets for respectively connecting the fluid motor to the drain of the hydraulic circuit.

Each of the piston operated poppets is identical in structure in that each includes a piston 88 having a downwardly extending skirt 89 and is centrally apertured to be telescopically received on the upper end of a stem 90. The piston is fixed in position on the stem 90 by an annular shoulder 91 against which the skirt 89 bottoms and a retaining ring 92 at the upper side of the piston received in a groove formed on the stem. In order to prevent oil leakage along the stem and piston, an O-ring 93 is provided in a groove formed on the stem. An O-ring 94 is mounted in a peripheral groove formed on the piston 88 to provide sealing engagement between the piston and a piston bore 95 formed in the upper body section 81.

The lower end of the stem 90 is freely movable in a bore that is diametrically sized smaller than the piston bore and which terminates in a seat 98 which in turn coacts with conical valve face 99 formed on the lower end of the stem 90. The diametrically reduced bore, identified by the numeral 100, forms an annular passageway with the stem 90. The piston skirt 89 for the drain poppet 84b and likewise for the drain poppet 85a freely moves within the piston bore 95 and also a bore 101 intermediate the piston bore and the bore 100 so that the valve face 99 communicates directly with the underside of the piston 88 and with the drain passage 21 that extends through the upper body section 81. The undersides of the pistons of poppets 84a and 85b also communicate with the drain passage 21 but the piston skirts of these poppets are in sealing engagement with a bore 102 by virtue of an O-ring 103 to isolate the conical valve face from the drain passageway. The supply passageway 22 communicates through a passageway 104 that is perpendicular to the bore 100 and the bore 102 to communicate the conical valve faces of the poppets 84a and 85b to the supply or pressure side of the hydraulic circuit. All of the piston operated poppets are resiliently biased to closed position by means of coil springs 106 which are bottomed at one end on the fluid end of bore 107 and on the other end on a shoulder 108 formed on the stem of the poppets. The supply passageway 22 also communicates with an upwardly extending passageway 109 in the upper body section 81 which would communicate with the inlets of the pilot valves 16 and 17. The outlets of the pilot valves would respectively be in communication with the upper sides of the pairs of poppets 84 and 85. Specifically, the pilot valve 16 would have its outlet in communication with the upper sides of the piston operated poppets 84a and 84b, while the pilot valve 17 would have its outlet in communication with the upper sides of the piston operated poppets 85a and 85b.

One side of the fluid motor to be controlled by the valve 15 would be connected to the port 115, while the other side of the fluid motor would be connected to the port 116. Port 115, as seen in FIG. 6, is in communication with the drain poppet 84b and the pressure or supply poppet 85b, while it is understood that the port 116 would be connected to the pressure or supply poppet 84a and the drain poppet 85a. Accordingly, when the set of poppets 84a and 84b is actuated by the pilot pressure being fed to the upper sides of the pistons thereof, the poppets 84a and 84b will function to respectively connect the pressure to one side of the fluid motor and drain to the other side of the fluid motor for causing the fluid motor to move in one direction. Actuation of the drain poppets 85a and 85b will cause reverse connections and operation of the fluid motor in the opposite direction. It will be appreciated that the drain poppets 84b and 85a are identical in structure and that poppet 84b operates relative port 115 and one side of the fluid motor, while poppet 85a operates relative port 116 and the other side of the fluid motor. Similarly, poppets 84a and 85b connected to the supply or pressure are identical in structure although poppet 84a is connected to the port 116, while poppet 85b is connected to the port 115. When no pilot pressure is applied to the poppets, the fluid motor will be locked in position.

It may be seen in FIG. 5 looking at the top of the upper body section 81 that the supply or pressure for the pilot valves is received from the porting system in the poppet valve assembly through fluid passages 118 and 119, and as above mentioned, the outlets of the pilot valves are in communication with the upper sides of the pairs of poppets 84 and 85.

Inasmuch as the electrically operated intrinsically safe valve of the invention will lock the fluid motor in position, it is necessary to provide pressure relief valves for both sides of the fluid motor where expansion of the hydraulic fluid is encountered during a temperature rise in the fluid. Accordingly, relief valves 122 and 123 are respectively provided for valve ports 115 and 116. The details of the relief valves may be appreciated by the details of relief valve 122 shown in FIG. 6 which includes a relief valve seat 124 formed in the lower body section 82 at the end of a port 125 in communication with the valve port 115. A ball 126 coacts with the seat 124 and is restrained in position by a plunger 127 urged thereagainst by a spring 128 bottoming at one end on the plunger and at the other end on an adjustable stop 129 in a bore 130. The relief valve 123 is identical in structure to that of the valve 122 but in communication with the valve port 116. A transverse bore 131 intersects the bore 130 and communicates with the drain 21 and the drain poppet 84b so that opening of the relief valve 122 will connect the valve port 115 to drain. The relief valve will remain open only long enough to relieve the pressure and then again close so that the fluid motor will be locked in its last position.

Figure 8:
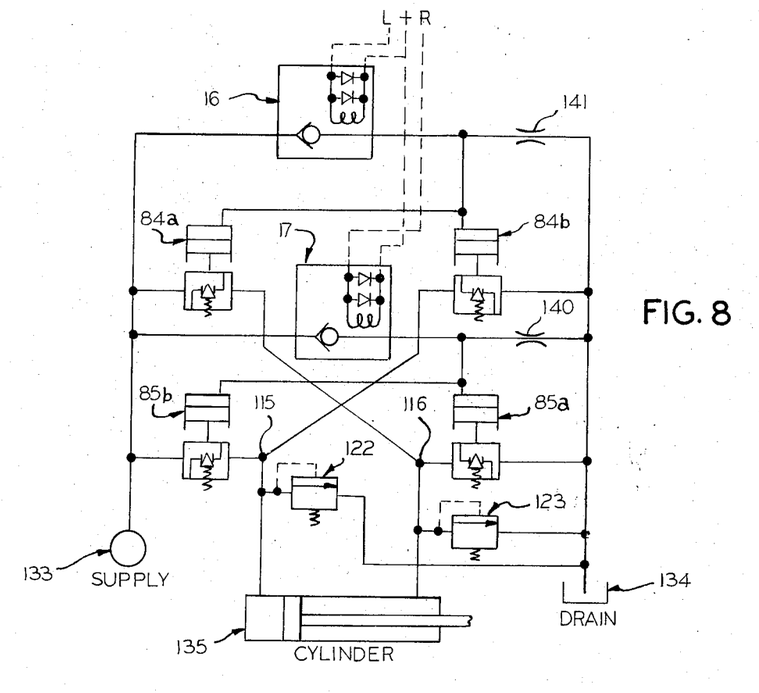
FIG. 8 is a hydraulic schematic diagram of the electrically operated valve according to the invention as connected to a hydraulic cylinder.

In order to illustrate the manner in which the intrinsically safe valve of the invention is connected in a hydraulic circuit, reference is made to the schematic diagram of FIG. 8 wherein the valve is shown connected to a supply 133 and a drain 134 and to a fluid motor 135 in the form of a hydraulic cylinder. As illustrated, the valve port 115 is connected to the head end of this cylinder, while the valve port 116 is connected to the rod end of the cylinder. When it is desired to drive the piston to the right, as seen in FIG. 8, pilot valve 17 is actuated to apply the supply or pressure 133 to the poppets 85a and 85b. Poppet 85a, being a drain poppet, connects the rod end of the cylinder to drain, while poppet 85b, being a supply poppet, connects the supply pressure to the head end of the cylinder, thereby driving the cylinder to the right. To stop the piston at any position the pilot valve 17 would be de-energized. While the springs for the piston operated poppets assure closing, the supply pressure acts on the supply poppet to assist in closing the supply poppet inasmuch as the area 136 is larger than the area 137 as illustrated by the supply poppet 85b in FIG. 6. Accordingly, a greater pressure is exerted against the supply poppet in the closing direction when the supply pressure is not moving through the pilot valve. Additionally, the cylinder line pressure acts on the area 138 of the supply poppet to close the supply poppet and on the like area of drain poppet 85a to close the drain poppet. Drain pressure also acts on area 139 or the underside of the pistons of the poppets in the closing direction. As already mentioned, pilot pressure, when it is provided by a pilot valve, always acts on the upper sides of the poppet pistons. When the pilot valve closes, the pressure on the upper sides of the pistons bleeds off to drain through a restriction 140 allowing the poppets to close. Similarly, when it is desired to move the piston in the cylinder 135 toward the left, the pilot valve 16 is actuated to apply pilot pressure to the tops of the poppet pistons of supply poppet 84a and drain poppet 84b. Actuation of supply poppet 84a connects the supply pressure to the rod end of the cylinder 135, while actuation of the drain poppet 84b connects the head end of the cylinder to drain. De-energization of the pilot valve then cuts off the pilot pressure to the poppets 84a and 84b, thereby allowing the pressure to bleed off to drain through a restriction 141. Then all pressures in the poppet valve assembly act to close the supply poppet 84a and the drain poppet 84b.

In the event of electrical failure to the pilot valves since they are normally closing, no pilot pressure will be transmitted to the poppets and all poppets will close or remain closed, as already explained in connection with de-energization of a pilot valve. Further, in the event of hydraulic failure it is immaterial that the pilot valves are open or closed as the pressures in the system relative the cylinder 135 and the springs on the poppets will act to close the poppets, thereby locking the cylinder in its last position. It can be further appreciated that the springs 72 in the pilot valves will operate to close the pilot valves in the event of hydraulic failure. When the poppets are all closed, such results in locking of the cylinder in the last position. It can now be appreciated that fluid pressure anywhere in the poppet valve assembly will cause closing of the poppet valve assembly unless pilot pressure is provided at the upper sides of either pair of poppets.

It should be further appreciated the intrinsically safe electrically operated valve of the present invention could be modified to function as a three-way valve for operation of two-to-one cylinders where the area of the piston at the head end is twice that at the rod end. In such an arrangement, the rod end of the cylinder would always be connected to supply pressure, while the head end of the cylinder would be controlled through a modified valve of the invention. In such an arrangement, the valve would use only a single drain poppet actuable by one pilot valve and a single supply poppet actuable by a second pilot valve, wherein when it is desired to drive the piston toward the rod end of the cylinder, the pilot valve associated with the supply poppet would be actuated to connect the supply pressure to the head end of the cylinder and because of the differential in area between the head end and the rod end of the piston, the piston would move toward the rod end of the cylinder. When it is desired to lock the cylinder in position, both pilot valves would be de-energized, and when it is desired to move the piston to the head end of the cylinder, the pilot valve operating the drain poppet would be energized to connect the head end of the cylinder to drain. At that time the supply pressure acting on the rod side of the piston would cause the piston to move toward the head end of the cylinder. In the event of electrical failure, the poppets would be in closed position and the pilot valves would be closed, thereby effectively locking the piston in its last position.

It will be understood that modifications and variations may be effected without departing from the scope of the novel concepts of the present invention, but it is understood that this application is to be limited only by the scope of the appended claims.

The invention is hereby claimed as follows:

1. An electromagnetic valve for controlling high pressure fluid flow in a line comprising a casing having an inlet for connection to a supply of high pressure fluid and an outlet for connection to a device to be driven by said supply, a coil within said casing, a pair of pole pieces within said coil in spaced relation to define an air gap therebetween, an armature within said coil extending across said air gap and coacting with both pole pieces, means pivotally mounting one end of the armature at one of said pole pieces wherein the armature swings relative the pole pieces, means extending from said one end of said armature defining a closure member, port means coacting with said closure member communicating with said outlet, and means communicating said inlet with said closure member, said inlet receiving supply pressure whereby said closure member is spaced from the port means to open same and intercommunicate the inlet and outlet when the coil is energized and the armature seated on the pole pieces, and the closure member is seated on the port means to close same when the coil is de-energized, wherein the relation between the closure member and port means is such that the supply pressure forces the closure member into seated position on the port means.

2. The valve defined by claim 1, wherein said pole pieces are formed to partially surround said armature.

3. The valve defined by claim 1, wherein means is provided to continually communicate the supply with all sides of said pivotal mounting means.

4. The valve defined by claim 1, wherein means is provided to normally bias said armature away from said pole pieces.

5. The valve defined in claim 1, wherein said pivotal mounting means includes a ball and socket arrangement.

6. An electromagnetic valve for controlling fluid flow in a high pressure fluid line comprising, a magnetic tubular casing, opposed magnetic end plates at each end of the casing closing the ends, a coil within the casing between the end plates, first and second spaced magnetic pole pieces within the coil and against the end plates, a non-magnetic section within the coil and between the pole pieces, a magnetic armature within the coil extending across said non-magnetic section and coacting with both said pole pieces, means pivotally mounting said armature at one end to one of the pole pieces, an extension on the armature, port means coacting with said extension, inlet means communicating with one side of said port means and outlet means communicating with the other side of the port means, said extension closing the port means when the coil is de-energized and opening the port means when the coil is energized.

7. An electromagnetic valve for use in hydraulic circuits to control the flow of high pressure fluid in a line, said valve comprising a casing having an inlet connected to supply pressure and an outlet, a coil within the casing, a pair of pole pieces in spaced relation and within said coil, an armature within the coil coacting with the pole pieces to complete the magnetic circuit therebetween when in seated position thereagainst, a ball portion on one end of the armature, a socket at a pole piece pivotally receiving the ball portion thereby pivotally mounting the armature, a generally cylindrical closure member extending from the ball portion, an annular land surrounding the closure member and having a port therein defining a valve seat, means communicating the port with the outlet, means communicating the land and closure member with the inlet, the relation between the land and closure member being such that the pressure drop due to fluid flow between the closure member and valve seat forces the closure member against the seat when the coil is de-energized.

8. The valve as defined in claim 7, and spring means normally urging said armature away from said pole pieces.

9. The valve as defined in claim 8, and means for continually communicating the armature end of the ball portion to the supply pressure.

10. The valve as defined in claim 9, wherein the closure member is coaxial with the armature.

11. The valve as defined in claim 10, wherein the closure member is slightly tapered.

12. An electromagnetic valve for controlling fluid flow in a high pressure fluid line comprising, a magnetic tubular casing, opposed magnetic end plates at each end of the casing closing the ends, a coil within the casing between the end plates, first and second spaced magnetic pole pieces within the coil and against the end plates, a non-magnetic section within the coil and between the pole pieces, a magnetic armature within the coil extending across said non-magnetic section and coacting with both said pole pieces and movable substantially perpendicular to the axis of the coil, a closure member on the armature, port means coacting with said closure member, inlet means communicating with one side of said port means and outlet means communicating with the other side of the port means, means mounting said armature so that said closure member closes said port means when the coil is de-energized and opens the port means when the coil is energized.

13. An electromagnetic valve as defined in claim 12, wherein the inlet and outlet means are arranged at one of the ends of the casing.

* * * * *